(12) United States Patent
Hong et al.

(10) Patent No.: US 9,598,535 B2
(45) Date of Patent: Mar. 21, 2017

(54) METHOD OF ENCAPSULATING POLY(ALKYLENE CARBONATE) AND MIXTURE PARTICLES THEREOF, AND USE THEREOF

(71) Applicants: SK Innovation Co., Ltd., Seoul (KR); SK Global Chemical Co., Ltd., Seoul (KR)

(72) Inventors: Seung Gweon Hong, Daejeon (KR); Jae Young Park, Daejeon (KR); Kwang Jin Chung, Daejeon (KR); Myung Ahn Ok, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 0 days.

(21) Appl. No.: 14/397,915

(22) PCT Filed: Apr. 26, 2013

(86) PCT No.: PCT/KR2013/003632
§ 371 (c)(1),
(2) Date: Oct. 30, 2014

(87) PCT Pub. No.: WO2013/165129
PCT Pub. Date: Nov. 7, 2013

(65) Prior Publication Data
US 2015/0132578 A1    May 14, 2015

(30) Foreign Application Priority Data

May 4, 2012 (KR) .......... 10-2012-0047760
Apr. 11, 2013 (KR) .......... 10-2013-0039724

(51) Int. Cl.
C08G 64/40    (2006.01)
B01J 13/12    (2006.01)
C08J 3/12    (2006.01)

(52) U.S. Cl.
CPC .......... *C08G 64/40* (2013.01); *B01J 13/12* (2013.01); *C08J 3/126* (2013.01); *C08J 2369/00* (2013.01); *Y10T 428/2998* (2015.01)

(58) Field of Classification Search
CPC .......... C08J 3/126–3/16; C08G 64/40
See application file for complete search history.

(56) References Cited

U.S. PATENT DOCUMENTS

| | | | |
|---|---|---|---|
| 5,041,469 A * | 8/1991 | Hostetler | C08J 3/091 521/189 |
| 5,919,872 A | 7/1999 | Tung et al. | |
| 8,937,126 B2 | 1/2015 | Shimizu et al. | |
| 2004/0171721 A1 | 9/2004 | Esemplare | |
| 2005/0146075 A1* | 7/2005 | Yamaguchi | B29B 9/04 264/211.12 |
| 2007/0104951 A1 | 5/2007 | Ito | |
| 2009/0169782 A1 | 7/2009 | Yu | |
| 2011/0003935 A1* | 1/2011 | Terada | C08F 220/18 524/853 |
| 2011/0008623 A1* | 1/2011 | Dhodapkar | B29B 9/16 428/407 |
| 2012/0053282 A1 | 3/2012 | Shimizu et al. | |
| 2012/0059078 A1 | 3/2012 | Kim et al. | |
| 2013/0251928 A1 | 9/2013 | Yu | |

FOREIGN PATENT DOCUMENTS

| | | | |
|---|---|---|---|
| CN | 101102852 A | 1/2008 | |
| CN | 102177193 A | 9/2011 | |
| DE | WO 2010100052 A1 * | 9/2010 | .......... C08L 69/00 |
| EP | 1693401 A1 | 8/2006 | |
| WO | 2006057635 A1 | 1/2006 | |

OTHER PUBLICATIONS

Machine translation of WO 2010/100052 (2010).*

* cited by examiner

*Primary Examiner* — Alexandre Ferre
(74) *Attorney, Agent, or Firm* — The Webb Law Firm

(57) ABSTRACT

The present invention relates to a poly(alkylene carbonate) capsule in which a heterogeneous resin is applied on a surface of poly(alkylene carbonate), and a method of manufacturing the same, and provides a poly(alkylene carbonate) capsule preventing blocking where particles agglomerate each other when a resin having surface stickiness at a glass transition temperature or higher is processed in a pellet or chip state and circulated, and a method of manufacturing the same.

4 Claims, No Drawings

METHOD OF ENCAPSULATING POLY(ALKYLENE CARBONATE) AND MIXTURE PARTICLES THEREOF, AND USE THEREOF

CROSS-REFERENCE TO RELATED APPLICATIONS

This application is the United States national phase of International Application No. PCT/KR2013/003632 filed Apr. 26, 2013, and claims priority to Korean Patent Application Nos. 10-2012-0047760 and 10-2013-0039724, filed May 4, 2012 and Apr. 11, 2013, respectively, the disclosures of which are hereby incorporated in their entirety by reference.

TECHNICAL FIELD

The present invention relates to a technology that is capable of preventing blocking during high-temperature circulation of a poly(alkylene carbonate) resin.

BACKGROUND ART

Recently, a technology of manufacturing poly(alkylene carbonate) through a copolymerization or multiple polymerization reaction of carbon dioxide and alkylene oxide monomers such as propylene oxide, ethylene oxide, butylene oxide, pentene oxide, hexylene oxide, cyclohexylene oxide, and octene oxide, or a mixture of the monomers has been developed, and an effort to commercialize the technology has been made under a debt for various physical properties and an environmentally friendly property thereof. Moreover, various kinds of copolymers and terpolymers have been developed by introducing a monomer in which another functional group is introduced into an alkylene derivative. However, in these various poly(alkylene carbonate)s, surface stickiness occurs at a glass transition temperature or higher, which causes a blocking phenomenon where particles agglomerate to each other during circulation in a general pellet or chip form, and thus it is necessary to perform circulation in a state where temperature is lower than the glass transition temperature and a low load. Accordingly, circulation and packaging costs are increased, and it is necessary to maintain a whole course from a pellet manufacturing course to transporting and storing at the glass transition temperature or lower.

A poly(cyclohexylene-propylene carbonate) terpolymer that is a terpolymer of cyclohexylene oxide-propylene oxide-carbon dioxide is disclosed, and in this case, a glass transition temperature is increased as the content of cyclohexylene carbonate is increased, but since a blocking phenomenon occurs due to surface stickiness at the glass transition temperature or higher, an anti-blocking method is required for stable circulation.

Poly(propylene carbonate) that is a kind of currently circulated poly(alkylene carbonate) is not circulated in a pure resin form, but circulated in a compound form mixed with other resins such as starches or inorganic fillers, or in some cases, circulated while processing the compound into a film form due to a blocking problem. The circulation of poly(alkylene carbonate) in the compound form reduces possibility variation of product forms which limit the application for various purposes.

DISCLOSURE OF INVENTION

Technical Problem

The present invention has been made to solve the problems, and an object of the present invention is to provide a method of encapsulating poly(alkylene carbonate), which is capable of preventing surface stickiness of poly(alkylene carbonate) at a glass transition temperature or higher.

Solution to Problem

An exemplary embodiment of the present invention is directed to providing a poly(alkylene carbonate) capsule in which a heterogeneous resin satisfying the following Equations 1 and 2 is applied on a surface of poly(alkylene carbonate).

$$70 \leq T \leq 270 \quad \text{[Equation 1]}$$

$$5{,}000 \leq Mw \leq 200{,}000 \quad \text{[Equation 2]}$$

(in Equation 1, T represents a melting point or a softening point (° C.), and in Equation 2, Mw represents a weight average molecular weight (g/mol)).

The heterogeneous resin is characterized in that there is no surface stickiness in the air.

Specifically, there is provided the poly(alkylene carbonate) capsule of which a surface is coated with one or a mixture of two or more selected from polymers such as polyamide, poly(butylene adipate-co-butylene-terephthalate), poly(butylene succinate), poly(butylene succinate-co-butylene adipate), cellulose acetate, triacetate cellulose, poly (methyl methacrylate), polyvinylpyrrolidone, polyvinylalcohol acetate, polyvinylalcohol, starch, styrenebutadienestyrene, acrylonitrilebutadienestyrene, styrenemaleic anhydride, ethylenemaleic anhydride, polylactic acid, a copolymer of lactide-glycolide (PLGA; poly D,L-lactide-co-glycolide), and polyhydroxyalkanoate.

Further, poly(alkylene carbonate) may include one or a multiple polymer of two or more selected from poly(alkylene carbonate) and diglycidyl ether, but is not limited thereto.

The present invention provides 0.5 to 10 parts by weight of the heterogeneous resin is included based on 100 parts by weight of the poly(alkylene carbonate).

Another exemplary embodiment of the present invention is directed to providing a method of manufacturing a poly (alkylene carbonate) capsule, including: applying a resin solution in which a heterogeneous resin is dissolved in poly(alkylene carbonate); and removing a solvent of the applied resin solution.

An organic solvent may be used as the solvent.

An aqueous solvent having surface tension of 55 dyne/cm or less may be used as another example of the solvent.

In this case, the aqueous solvent may further include an alcohol-based solvent and a surfactant.

Advantageous Effects of Invention

The present invention can minimize an effect to processing of poly(alkylene carbonate) to perform processing in various forms, and can improve surface stickiness to avoid a limitation in a superimposed load and a temperature during circulation and storage.

Mode for the Invention

The present invention is accomplished by providing a poly(alkylene carbonate) capsule in which a heterogeneous resin is applied on a surface of poly(alkylene carbonate).

More specifically, the present invention provides a poly(alkylene carbonate) capsule in which a heterogeneous resin is applied on a surface of a poly(alkylene carbonate) pellet or chip.

The present invention prevents blocking even though the poly(alkylene carbonate) resin receives a predetermined load at a glass transition temperature or higher, since adhesive strength between the heterogeneous resin applied on the surface and the pellet or chip type poly(alkylene carbonate) resin is excellent, stripping of the heterogeneous resin does not occur even after coating, and it is important to minimize an effect to transparency or mechanical properties thereof in the course of processing the capsule according to the present invention.

The poly(alkylene carbonate) resin according to the present invention includes either a copolymer or a terpolymer, and both of a type in which another resin is blended with each resin and a type in which another inorganic material is mixed with each resin may be used.

Examples of poly(alkylene carbonate) may include one or a multiple polymer of two or more selected from ethylene oxide, propylene oxide, glycidyl alkyl ether, glycidyl acrylate, and diglycidyl ether.

Poly(propylene carbonate) having a molecular weight of 5,000 to 300,000 g/mole is used as an example of the present invention, but the example is not limited thereto.

The heterogeneous resin has no stickiness in the air, compatibility with the poly(alkylene carbonate) resin is important, and it is preferable to select a matter having miscibility in at least a portion thereof. For example, it is preferable to select one or a mixture of two or more selected from polyamide, poly(butylene adipate-co-butylene-terephthalate), poly(butylene succinate), poly(butylene succinate-co-butylene adipate), cellulose acetate, triacetate cellulose, poly(methyl methacrylate), polyvinylpyrrolidone, polyvinylalcohol acetate, polyvinylalcohol, starch, styrenebuta-dienestyrene, acrylonitrilebutadienestyrene, styrenemaleic anhydride, ethylenemaleic anhydride, polylactic acid, and a copolymer of lactide-glycolide (PLGA; poly D,L-lactide-co-glycolide).

A weight average molecular weight of the heterogeneous resin is not limited, but preferably 5,000 to 200,000 g/mole, and more preferably 10,000 to 200,000 g/mole. Further, a melting point or a softening point of the heterogeneous resin is preferably 70 to 270° C. and more preferably 100 to 160° C., which is effective because a coating layer may be uniformly formed due to partial compatibility with poly(alkylene carbonate).

Further, it is preferable that the heterogeneous resin be dissolved in an alcohol solvent such as ethanol or propanol.

Blocking does not occur at least at 70° C. or less in the poly(alkylene carbonate) capsule according to the present invention by applying the heterogeneous resin.

Further, in order to accomplish the aforementioned object, it is preferable that the components constituting the poly(alkylene carbonate) capsule include 0.5 to 10 parts by weight of the heterogeneous resin is included based on 100 parts by weight of the poly(alkylene carbonate). In the case where the content is less than 0.5, since a coating thickness is small, it is difficult to show a blocking prevention characteristic, and if the content is more than 10 parts by weight, the content may affect physical properties of poly(alkylene carbonate).

Further, it is preferable that the coating thickness of the heterogeneous resin be 0.05 to 100 μm. In the case where the content is less than 0.05 μm, a blocking property effect is insignificant, and in the case where the content is more than 100 μm, there is a disadvantage in that a processing property is reduced.

Further, the present invention provides a method of manufacturing a poly(alkylene carbonate) capsule, including: applying a resin solution in which a heterogeneous resin is dissolved in poly(alkylene carbonate); and removing a solvent of the applied resin solution.

First, a step of applying the resin solution in which the heterogeneous resin is dissolved in poly(alkylene carbonate) will be described.

Herein, it is preferable the heterogeneous resin be one or a mixture of two or more selected from polyamide, poly(butylene adipate-co-butylene-terephthalate), poly(butylene succinate), poly(butylene succinate-co-butylene adipate), cellulose acetate, triacetate cellulose, poly(methyl methacrylate), polyvinylpyrrolidone, polyvinylalcohol acetate, polyvinylalcohol, starch, styrenebutadienestyrene, acrylonitrilebutadienestyrene, styrenemaleic anhydride, ethylenemaleic anhydride, polylactic acid, and a copolymer of lactide-glycolide (PLGA; poly D,L-lactide-co-glycolide).

The present invention provides a method of manufacturing the poly(alkylene carbonate) capsule, in which a solvent suitable for the heterogeneous resin is selected and wettability is provided to the surface of the pellet or chip so that coating is well performed.

To this end, it is preferable that poly(alkylene carbonate) and the heterogeneous resin be mixed by maintaining a dissolving ability, determining a composition of the solvent for improving wettability, and selecting an appropriate surfactant. Further, alcohol and an antifoaming agent may be mixed in order to prevent coating inferiority due to the occurrence of foams in the processing course such as a coating process, and storage and transporting of the solution.

The solvent may be used without a limitation as long as the solvent is an organic solvent or an aqueous solvent that is capable of dissolving the heterogeneous resin.

Particularly, among the aforementioned heterogeneous resins, poly(butylene adipate-co-butylene-terephthalate) (PBAT), poly(butylene succinate) (PBS), poly(butylene succinate-co-butylene adipate) (PBSA), cellulose acetate (CA), triacetate cellulose (TAC), and poly(methyl methacrylate) (PMMA) resins have a rapid vaporization speed and high solubility to a polar solvent like acetone, methylene chloride (MC), propylene glycolether acetate (PGEA), methylethylketone (MEK), tetrahydrofuran (THF), and the like, which are preferable.

Further, in the case of polyvinyl pyrrolidone (PVP), polyvinyl alcohol acetate (PVAc), and polyamide, it is preferable to use low alcohols such as methanol, ethanol, and isopropanol as the solvent, in the case of polyvinyl alcohol (PVA) and starch, water may be used as the solvent, and in the case of styrenebutadienestyrene (SBS), acrylonitrilebutadienestyrene (ABS), styrenemaleic anhydride (SMA), and ethylenemaleic anhydride (EMA), it is preferable to use an organic solvent such as toluene, methylcyclohexane, and methylene chloride.

The content of the solid of the resin solution is not largely limited, but is 1 to 50% and more preferably 1 to 20%.

A coating method is not largely limited, and known coating methods such as spray coating and dip coating may be used.

Next, a step of removing the solvent of the applied resin solution will be described.

In the case where the organic solvent is used, since poly(alkylene carbonate) may be dissolved together, drying should be sufficiently rapidly performed after coating. Particularly, in the case where the polar organic solvent is used, the solvent can be prevented from permeating the poly(alkylene carbonate) pellet or chip only when the solvent is vaporized while coming into contact with the surface of the pellet or the chip. To this end, in the case where the organic solvent is used, a course of performing drying by air or nitrogen immediately after coating should be invariably performed.

In the case where the aqueous solvent is used, since poly(alkylene carbonate) is not swollen by water due to high hydrophobicity of poly(alkylene carbonate), it is unnecessary to shorten a drying time.

However, there is obtained the conclusion that it is preferable to provide the aqueous solvent having surface tension of 55 dyne/cm or less in order to form a uniform coating film having wettability, that is, spreadability due to hydrophobicity of poly(alkylene carbonate). More preferably, the surface tension is in the range of 20 to 50 dyne/cm.

However, since an aqueous coating solution should be applied on the hydrophobic surface, it is advantageous to form a composition of promoting vaporization in order to increase wettability to the surface of poly(alkylene carbonate) and reduce a drying time of moisture. Accordingly, in the case of the aqueous solvent, there is provided the method of manufacturing the poly(alkylene carbonate) capsule further including an alcohol-based solvent and a surfactant in order to provide the aqueous solvent having surface tension of 55 dyne/cm or less.

The surfactant may be selected from surfactants used in aqueous paints or ink, and one or a mixture of two or more of a nonion-based surfactant, an anion-based surfactant, and a cation-based surfactant may be used.

Further, the alcohol-based solvent is not largely limited, but wettability may be improved by providing the aqueous solvent having surface tension of 55 dyne/cm or less adopting one or a mixture of two or more selected from methanol, ethanol, n-propanol, iso-propanol, and the like.

Further, an alcohol-based solvent or a silicon-based antifoaming agent may be added in a small amount in order to prevent foams from being formed.

The coating solution manufactured by the aforementioned method has strong adhesive strength to the surface of poly(alkylene carbonate) and may form a uniform coat film.

In the case of the aqueous solvent, examples of a method of applying the resin solution include a method of immersing strands in a coating solution during a middle stage and then manufacturing pellets or chips, and a method of applying die-face cutting to coat a surface so that extrusion into a coating solution is performed, removing the solution applied in an excessive amount by centrifugation, and performing drying to form a thin film on the surface.

In the case of a non-polar solvent not dissolving poly(alkylene carbonate), such as toluene, among the coating solutions using the organic solvent, a method of wetting strands and drying the strands during a back step, and a method of manufacturing pellets or chips, dipping the pellets or the chips in a solution, removing the solution in an excessive amount from a surface by a centrifugal separator, and performing drying to form a coat film may be used.

In the case of the coating solution dissolving poly(alkylene carbonate), a drying time is set to be very short, thus preventing the solvent from permeating poly(alkylene carbonate). To this end, when the strands pass through a ring-shaped spray device, the solution may be sprayed in a cylindrical direction of the strand and directly subsequently air or nitrogen may be blown to perform drying, thus forming a coat film.

In the case of the pellets manufactured as described above, poly(alkylene carbonate) may be exposed at both cross-sections thereof according to the manufacturing method, but an anti-blocking effect is not largely reduced. In a blocking test, blocking was defined based on an ASTM D3003-94 regulation, a load of 30 to 300 $g/cm^2$ was set to be provided by calculating the load provided when pellets or chips were loaded, and thereafter, occurrence of blocking was confirmed while changing a temperature. As a result, in the resins, blocking was prevented under a load of up to 300 $g/cm^2$ and at a temperature of up to 70° C., and if the load was reduced, the temperature at which blocking was prevented could be increased to 100° C. Accordingly, as a method for increasing the blocking prevention temperature, a limitation in maximum loading height can be avoided by performing carton box packaging together.

Hereinafter, the present invention will be described in more detail by the following Examples. However, the following Examples are set forth to illustrate but are not to limit the present invention.

EXAMPLE 1

Manufacturing of the Resin Solution

1) Poly(butylene adipate-co-butylene-terephthalate) (molecular weight: 130,000 g/mole, MP: 120° C.) was dissolved in a concentration of 5% in methylene chloride at 50° C. and then stored in a bottle with a cap.

2) Poly(butylene succinate) (molecular weight: 70,000 g/mole, MP: 113° C.) was dissolved in a concentration of 3% in methylene chloride at 50° C. and then stored in a bottle with a cap.

3) Poly(butylene succinate-co-butylene adipate) (molecular weight: 80,000 g/mole, MP: 105° C.) was dissolved in a concentration of 3% in methylene chloride at 50° C. and then stored in a bottle with a cap.

4) Cellulose acetate (molecular weight: 70,000 g/mole, MP: 220° C.) was dissolved in a concentration of 3% in acetone at 50° C. and then stored in a bottle with a cap.

5) Triacetate cellulose (molecular weight: 80,000 g/mole, MP: 260° C.) was dissolved in a concentration of 3% in acetone at 50° C. and then stored in a bottle with a cap.

6) Poly(methyl methacrylate) (molecular weight: 300,000 g/mole, MP: 160° C.) was dissolved in a concentration of 3% in acetone at 50° C. and then stored in a bottle with a cap.

7) Polyvinyl pyrrolidone (molecular weight: 40,000 g/mole, MP: 150° C.) was dissolved in a concentration of 3% in ethanol at 50° C. and then stored in a bottle with a cap.

8) Polyvinyl pyrrolidone (molecular weight: 40,000 g/mole, MP: 150° C.) was dissolved in a concentration of 5% in water at 50° C., ethanol was added to perform dilution to a concentration of 3%, 0.1% of polyoxyethylene was added, and the resulting material was stored in a bottle with a cap.

9) Polyvinyl alcohol acetate (molecular weight: 100,000 g/mole, SP: 70° C.) was dissolved in a concentration of 3% in ethanol at 50° C. and then stored in a bottle with a cap.

10) Polyvinyl alcohol (molecular weight: 80,000 g/mole, MP: 200° C.) was dissolved in a concentration of 5% in water at 50° C., dilution was performed by ethanol to a concentration of 3%, 0.1% of polyoxyethylene having a molecular weight of 400 g/mole was added and agitated well, surface tension was adjusted to 50 dyne/cm or less, and the resulting material was stored in a bottle with a cap.

11) Starch (molecular weight: 200,000 g/mole, SP: 80° C.) was dissolved in a concentration of 3% in water at 50°

C., 0.1% of polyoxyethylene having the molecular weight of 400 g/mole was added, and the resulting material was stored in a bottle with a cap.

12) Styrenebutadienestyrene (molecular weight: 150,000 g/mole, SP: 150° C.) was dissolved in a concentration of 3% in toluene at 50° C. and then stored in a bottle with a cap.

13) Acrylonitrilebutadienestyrene (molecular weight: 200,000 g/mole, SP: 150° C.) was dissolved in a concentration of 3% in toluene at 50° C. and then stored in a bottle with a cap.

14) Styrenemaleic anhydride (molecular weight: 200,000 g/mole, SP: 120° C.) was dissolved in a concentration of 3% in toluene at 50° C. and then stored in a bottle with a cap.

15) Ethylenemaleic anhydride (molecular weight: 200,000 g/mole, SP: 250° C.) was dissolved in a concentration of 3% in toluene at 50° C. and then stored in a bottle with a cap.

16) Polyamide (manufacturing company: Thomas Swan & Co., Ltd. (UK), product name: CASAMID 878, SP: 150° C.) was dissolved in a concentration of 4% in ethanol at 50° C. and then stored in a bottle with a cap.

EXAMPLE 2

Poly(propylene carbonate) having the weight average molecular weight of 150,000 g/mol was extruded in the extruder and, at the same time, passed at a speed of 10 m/min while being immersed in resin solution 1) of Example 1, and passed through the air curtain at 40° C. to form a dried coat film. The strand on which the coat film was applied was used to manufacture pellets by using the pelletizer. A load of 250 g/cm² was applied to the coated pellet, the pellet was left at 70° C. for 24 hours, and it was confirmed whether blocking occurred or not.

EXAMPLE 3

The coat film was formed and the pellet was manufactured by using resin solution 2) of Example 1 as the solution in Example 2, and the blocking test was performed.

EXAMPLE 4

The coat film was formed and the pellet was manufactured by using resin solution 3) of Example 1 as the solution in Example 2, and the blocking test was performed.

EXAMPLE 5

The coat film was formed and the pellet was manufactured by using resin solution 4) of Example 1 as the solution in Example 2, and the blocking test was performed.

EXAMPLE 6

The coat film was formed and the pellet was manufactured by using resin solution 5) of Example 1 as the solution in Example 2, and the blocking test was performed.

EXAMPLE 7

The coat film was formed and the pellet was manufactured by using resin solution 6) of Example 1 as the solution in Example 2, and the blocking test was performed.

EXAMPLE 8

The coat film was formed and the pellet was manufactured by using resin solution 7) of Example 1 as the solution in Example 2, and the blocking test was performed.

EXAMPLE 9

The coat film was formed and the pellet was manufactured by using resin solution 8) of Example 1 as the solution in Example 2, and the blocking test was performed.

EXAMPLE 10

The coat film was formed and the pellet was manufactured by using resin solution 9) of Example 1 as the solution in Example 2, and the blocking test was performed.

EXAMPLE 11

The coat film was formed and the pellet was manufactured by using resin solution 10) of Example 1 as the solution in Example 2, and the blocking test was performed.

EXAMPLE 12

The coat film was formed and the pellet was manufactured by using resin solution 11) of Example 1 as the solution in Example 2, and the blocking test was performed.

EXAMPLE 13

The coat film was formed and the pellet was manufactured by using resin solution 12) of Example 1 as the solution in Example 2, and the blocking test was performed.

EXAMPLE 14

The coat film was formed and the pellet was manufactured by using resin solution 13) of Example 1 as the solution in Example 2, and the blocking test was performed.

EXAMPLE 15

The coat film was formed and the pellet was manufactured by using resin solution 14) of Example 1 as the solution in Example 2, and the blocking test was performed.

EXAMPLE 16

Manufacturing was performed by the same method as Example 2, the coat film was formed and the pellet was manufactured by resin solution 15) of Example 1, and the blocking test was performed.

EXAMPLE 17

Manufacturing was performed by the same method as Example 2, die-face cutting was performed while performing extrusion into resin solution 8) of Example 1 to manufacture the pellet, and the blocking test was performed.

EXAMPLE 18

Manufacturing was performed by the same method as Example 17, the coat film was formed and the pellet was manufactured by resin solution 10) of Example 1, and the blocking test was performed.

EXAMPLE 19

Manufacturing was performed by the same method as Example 17, the coat film was formed and the pellet was manufactured by resin solution 11) of Example 1, and the blocking test was performed.

EXAMPLE 20

Manufacturing was performed by the same method as Example 17, poly(ethylene carbonate) having the weight average molecular weight of 200,000 g/mole was used instead of poly(propylene carbonate) to manufacture the pellet, and the blocking test was performed.

EXAMPLE 21

Manufacturing was performed by the same method as Example 17, poly(propylene carbonate) and PBAT were mixed at a weight ratio of 1:1 instead of poly(propylene carbonate) to manufacture the extruded pellet, coating was performed, and the blocking test was performed.

EXAMPLE 22

Manufacturing was performed by the same method as Example 2, the coat film was formed and the pellet was manufactured by resin solution 16) of Example 1, and the blocking test was performed.

COMPARATIVE EXAMPLE 1

The pellet having the weight average molecular weight of 150,000 g/mole was manufactured without a coating step, and the blocking test was performed.

The blocking test results of Examples 2 to 22 and Comparative Example 1 are described in Table 1. In the blocking test, under a condition of a load of 250 g/cm$^2$ and a temperature of 70° C., the case where the pellet particles were separated from each other was represented by the term "none", and the case where the pellet particles agglomerated each other to form one lump and were not separated from each other was represented by the term "occurrence". Further, it could be seen that blocking did not occur under the condition of the load of 30 g/cm$^2$ and the temperature of 100° C. for 12 hours.

TABLE 1

Results of the blocking test at a load of 250 g/cm$^2$ and a temperature of 70° C.

|  | Occurrence of blocking |
|---|---|
| Example 2 | None |
| Example 3 | None |
| Example 4 | None |
| Example 5 | None |
| Example 6 | None |
| Example 7 | None |
| Example 8 | None |
| Example 9 | None |
| Example 10 | None |
| Example 11 | None |
| Example 12 | None |
| Example 13 | None |
| Example 14 | None |
| Example 15 | None |
| Example 16 | None |
| Example 17 | None |
| Example 18 | None |
| Example 19 | None |
| Example 20 | None |
| Example 21 | None |
| Example 22 | None |
| Comparative Example 1 | Occurrence |

From the blocking test results, it was confirmed that the encapsulating method by coating of the surface of poly(alkylene carbonate) of the present invention could prevent blocking at the glass transition temperature or higher to ensure convenience in the course of transporting and storing.

Further, poly(alkylene carbonate) of Examples 2 to 22 and Comparative Example 1 manufactured by the present invention were used to manufacture a casting film by extrusion, a sheet was manufactured by the calendar method, mechanical properties (tensile stress and tensile strain) were measured based on ASTM D638, and the results are described in Table 2.

TABLE 2

Measurement results of tensile stress and tensile strain after coating

|  | Tensile stress (MPa) | Tensile strain (%) |
|---|---|---|
| Example 2 | 30.42 | 20 |
| Example 3 | 31.10 | 25 |
| Example 4 | 29.13 | 25 |
| Example 5 | 29.53 | 30 |
| Example 6 | 28.3 | 30 |
| Example 7 | 29.1 | 15 |
| Example 8 | 29.84 | 20 |
| Example 9 | 31.12 | 10 |
| Example 10 | 30.3 | 20 |
| Example 11 | 33.12 | 20 |
| Example 12 | 32.13 | 10 |
| Example 13 | 28.88 | 20 |
| Example 14 | 31.19 | 30 |
| Example 15 | 31.56 | 10 |
| Example 16 | 29.6 | 10 |
| Example 17 | 30.5 | 20 |
| Example 18 | 31.6 | 20 |
| Example 19 | 28.97 | 20 |
| Example 20 | 29.5 | 20 |
| Example 21 | 29.76 | 30 |
| Example 22 | 29.10 | 10 |
| Comparative Example 1 | 29.03 | 20 |

As described in Table 2, the poly(alkylene carbonate) sheet of Examples 2 to 22 manufactured by the present invention had tensile stress and tensile strain that were hardly different from those of the sheet of Comparative Example 1 without the coating step of the heterogeneous resin, and thus it was confirmed that there was no difference in mechanical properties of poly(alkylene carbonate) even though the coating layer of the heterogeneous resin was present. Accordingly, it could be seen that an effect to a post-processing process was minimized by selecting the heterogeneous resin having partial compatibility with poly(alkylene carbonate).

As described above, the preferable exemplary embodiments of the present invention have been described in detail, but the person with ordinary skill in the art to which the present invention belongs may make and utilize various exemplary embodiments of the present invention, as well as various alternatives and modifications thereof, which do not depart from the spirit and scope of the present invention defined by the accompanied claims. Therefore, it should be understood that the present invention is not limited to the aforementioned embodiments.

The invention claimed is:

1. A poly(propylene carbonate) capsule in which a dissolved heterogeneous resin satisfying the following Equations 1 and 2 is applied on a surface of poly(propylene carbonate):

$$70 \leq T \leq 270 \quad \text{[Equation 1]}$$

$$5{,}000 \leq Mw \leq 200{,}000 \quad \text{[Equation 2]},$$

wherein T represents a melting point or a softening point in °C., and Mw represents a weight average molecular weight in g/mol, and wherein the heterogeneous resin is one or a mixture of two or more selected from, poly(butylene adipate-co-butylene-terephthalate), poly(butylene succinate), poly(butylene succinate-co-butylene adipate), cellulose acetate, triacetate cellulose, polyvinylpyrrolidone, starch, styrenebutadienestyrene, acrylonitrilebutadienestyrene, styrenemaleic anhydride, polylactic acid, and a copolymer of lactide-glycolide.

2. The poly(alkylene carbonate) capsule of claim 1, wherein the poly(alkylene carbonate) includes one or a multiple polymer of two or more selected from ethylene oxide, propylene oxide, glycidyl alkyl ether, glycidyl acrylate, and diglycidyl ether.

3. The poly(alkylene carbonate) capsule of claim 1, wherein 0.5 to 10 parts by weight of the heterogeneous resin is included based on 100 parts by weight of the poly(alkylene carbonate).

4. A poly(propylene carbonate) capsule in which a dissolved heterogeneous resin is applied on a surface of poly(propylene carbonate), wherein the heterogeneous resin is one or a mixture of two or more selected from polyamide, poly(butylene adipate-co-butylene-terephthalate), poly(butylene succinate), poly(butylene succinate-co-butylene adipate), cellulose acetate, triacetate cellulose, polyvinylpyrrolidone, styrenebutadienestyrene, acrylonitrilebutadienestyrene, styrenemaleic anhydride, polylactic acid, and a copolymer of lactide-glycolide.

* * * * *

UNITED STATES PATENT AND TRADEMARK OFFICE
CERTIFICATE OF CORRECTION

| | | |
|---|---|---|
| PATENT NO. | : 9,598,535 B2 | Page 1 of 1 |
| APPLICATION NO. | : 14/397915 | |
| DATED | : March 21, 2017 | |
| INVENTOR(S) | : Seung Gweon Hong et al. | |

It is certified that error appears in the above-identified patent and that said Letters Patent is hereby corrected as shown below:

In the Claims

Column 12, Line 4, Claim 2, delete "poly(alkylene carbonate)" and insert
-- poly(propylene carbonate) --

Column 12, Line 5, Claim 2, delete "poly(alkylene carbonate)" and insert
-- poly(propylene carbonate) --

Column 12, Line 9, Claim 3, delete "poly(alkylene carbonate)" and insert
-- poly(propylene carbonate) --

Column 12, Lines 11-12, Claim 3, delete "poly(alkylene carbonate)" and insert
-- poly(propylene carbonate) --

Signed and Sealed this
Twenty-third Day of May, 2017

Michelle K. Lee
*Director of the United States Patent and Trademark Office*